United States Patent
Lewis

(10) Patent No.: US 9,614,400 B2
(45) Date of Patent: Apr. 4, 2017

(54) DC ENERGY STORE SYSTEMS AND METHODS OF OPERATING THE SAME

(75) Inventor: Eric Anthony Lewis, Warwickshire (GB)

(73) Assignee: GE Energy Power Conversion Technology LTD (GB)

( * ) Notice: Subject to any disclaimer, the term of this patent is extended or adjusted under 35 U.S.C. 154(b) by 727 days.

(21) Appl. No.: 13/703,472

(22) PCT Filed: Jun. 8, 2011

(86) PCT No.: PCT/EP2011/002795
§ 371 (c)(1),
(2), (4) Date: Jan. 22, 2013

(87) PCT Pub. No.: WO2011/157370
PCT Pub. Date: Dec. 22, 2011

(65) Prior Publication Data
US 2013/0169045 A1 Jul. 4, 2013

(51) Int. Cl.
*H02J 1/10* (2006.01)
*H02J 3/38* (2006.01)
(Continued)

(52) U.S. Cl.
CPC .............. *H02J 9/04* (2013.01); *H02J 9/062* (2013.01); *H02M 7/66* (2013.01); *Y10T 307/344* (2015.04)

(58) Field of Classification Search
CPC ............ Y10T 307/344; Y10T 307/625; Y10T 307/615; Y10T 307/406; Y10T 307/549;
(Continued)

(56) References Cited

U.S. PATENT DOCUMENTS 5,234,319 A * 8/1993 Wilder .................. F04B 49/025
417/40
6,225,708 B1 * 5/2001 Furukawa ................. G06F 1/30
307/23
(Continued)

FOREIGN PATENT DOCUMENTS

CN 101501977 A 8/2009

OTHER PUBLICATIONS

Unofficial English translation of Office Action issued in connection with corresponding CN Application No. 201180029587.3 on Sep. 1, 2014.

*Primary Examiner* — Jared Fureman
*Assistant Examiner* — Esayas Yeshaw
(74) *Attorney, Agent, or Firm* — Wood IP LLC

(57) ABSTRACT

A dc energy store system includes a dc energy store, an AC/DC power converter having ac terminals connected to an ac power supply and dc terminals connected to the dc energy store, and at least one auxiliary unit associated with the dc energy store. The dc energy store system is adapted to be operated in a number of different operating modes including: (i) a first mode to supply power from the ac power supply to the dc energy store; (ii) a second mode to supply power from the dc energy store to the ac power supply; (iii) a third mode to supply power from the ac power supply to the auxiliary unit(s); and (iv) a fault mode where there is a fault in the ac power supply, and power is supplied from the dc energy store to the auxiliary unit(s).

18 Claims, 3 Drawing Sheets

(51) Int. Cl.
  *H02J 9/00* (2006.01)
  *H02J 9/04* (2006.01)
  *H02J 9/06* (2006.01)
  *H02M 7/66* (2006.01)

(58) Field of Classification Search
  CPC .............. Y10T 307/305; Y10T 307/62; Y10T 307/352; Y10T 307/469; Y10T 307/696; Y10T 29/49117; Y10T 307/25
  USPC .......................................................... 307/23
  See application file for complete search history.

(56) References Cited

U.S. PATENT DOCUMENTS

| | | | |
|---|---|---|---|
| 6,795,322 B2* | 9/2004 | Aihara | H02J 9/061 307/64 |
| 7,880,334 B2* | 2/2011 | Evans | H02J 3/387 307/66 |
| 8,115,339 B2* | 2/2012 | Jung | H02J 9/062 307/64 |
| 2002/0113441 A1* | 8/2002 | Obayashi | H02J 1/14 290/40 C |
| 2003/0160514 A1* | 8/2003 | Rajagopalan | H02J 9/062 307/65 |
| 2005/0184594 A1* | 8/2005 | Fredette | H01M 16/003 307/78 |
| 2006/0014054 A1 | 1/2006 | Sugawara | |
| 2006/0017328 A1* | 1/2006 | Bryde | H02J 9/061 307/64 |
| 2007/0085421 A1* | 4/2007 | Drubel | H02J 1/16 307/43 |

* cited by examiner

DC ENERGY STORE SYSTEMS AND METHODS OF OPERATING THE SAME

FIELD OF THE INVENTION

The present invention relates to dc energy store systems, and in particular to methods of using the dc energy store to supply power to one or more auxiliary systems of the dc energy store.

BACKGROUND OF THE INVENTION

DC energy stores can be implemented from many different technologies such as batteries (e.g. lithium and sodium sulphur type), capacitors including supercapacitors and ultracapacitors, and flow cells (e.g. vanadium redox flow cells). In a typical dc energy store system an AC/DC power converter is interposed between the dc energy store and an ac power supply. More particularly, the AC/DC power converter has ac terminals connected to the ac power supply and dc terminals connected to the dc energy store by means of a dc link. The AC/DC power converter can be of any suitable type with a conventional two- or three-level topology with a series of semiconductor power switching devices fully controlled and regulated using a pulse width modulation strategy.

AC power is supplied from the ac power supply and stored in the dc energy store. In this mode of operation the AC/DC power converter acts as an active rectifier and converts the ac power to dc power that is compatible with the dc energy store. When the stored energy is needed then the AC/DC power converter can act as an inverter to convert the dc power to ac power that is compatible with the ac power supply. The AC/DC power converter is therefore capable of bidirectional power flow.

This ability to store and release energy is useful in a number of different applications including storing excess wind energy and releasing that energy at a later time when less wind energy is available. A different application is to store energy in case an electrical generator stops operating. The energy stored in the dc energy store can then be used to keep essential systems and services operating until a standby or back-up generator is started and brought into operation. In some circumstances it can also be helpful to store energy slowly and allow the energy stored in the dc energy store to be released very quickly for applications that need high power pulses of energy like the linear electrical motors that are used to start roller coasters.

The dc energy store system will normally include one or more auxiliary units such as pumps, fans, control units or other devices that are connected to the ac power supply. A control unit can be used to control the operation of the AC/DC power converter and may be associated with its own uninterruptible power supply (UPS) so that it can continue to operate during short duration transients of the ac power supply. However, the UPS can be expensive if it is designed to supply power to the control unit for long periods of time such as 10 minutes or more. If the ac power supply is interrupted or experiences voltage or frequency transients then the other auxiliary units will not receive power and this can cause problems with the practical operation of the dc energy store. For example, if the fans that are used to cool the dc energy store stop working then this can result in unacceptable temperature increases. Certain types of dc energy store also require pumps to continue running at their optimum efficiency.

SUMMARY OF THE INVENTION

The present invention provides a method of operating a dc energy store system comprising a dc energy store, an AC/DC power converter having ac terminals connected to an ac power supply and dc terminals connected to the dc energy store (optionally by means of an interposing DC/DC power converter), and at least one auxiliary unit associated with the dc energy store, the at least one auxiliary unit optionally being a pump, a fan, an uninterruptible power supply (UPS), control unit or other device, the method comprising the steps of: (i) in a first mode supplying power from the ac power supply to the dc energy store; (ii) in a second mode supplying power from the dc energy store to the ac power supply; (iii) in a third mode supplying power from the ac power supply to the at least one auxiliary unit associated with the dc energy store; and (iv) in the event of a fault in the ac power supply, supplying power from the dc energy store to the at least one auxiliary unit associated with the dc energy store.

The present invention further provides a dc energy store system operated according to the method described above.

The present invention further provides a dc energy store system comprising: a dc energy store; an AC/DC power converter having ac terminals connected to an ac power supply and dc terminals connected to the dc energy store; and at least one auxiliary unit associated with the dc energy store, the at least one auxiliary unit optionally being a pump, a fan, a UPS, control unit or other device; wherein the dc energy store system is adapted to be operated: (i) in a first mode to supply power from the ac power supply to the dc energy store; (ii) in a second mode to supply power from the dc energy store to the ac power supply; (iii) in a third mode to supply power from the ac power supply to the at least one auxiliary unit associated with the dc energy store; and (iv) in the event of a fault in the ac power supply, to supply power from the dc energy store to the at least one auxiliary unit associated with the dc energy store.

During the first mode, energy is stored in the dc energy store. During the second mode, energy stored in the dc energy store is returned to the ac power supply. This return of stored energy can be carried out as part of the normal operation of the dc energy store system (e.g. for the reasons described in more detail above) or during a fault condition where power is supplied to the fault in the ac power supply.

Certain modes may run concurrently. For example, during normal operation of the dc energy store system, ac power can be supplied from the ac power supply to the auxiliary unit(s) (third mode) at the same time as power is being supplied from the ac power supply to the dc energy store (first mode) or from the dc energy store to the ac power supply (second mode).

During the first mode the AC/DC power converter acts as an active rectifier and converts the ac power to dc power that is compatible with the dc voltage of the dc energy store. An interposing DC/DC power converter can optionally be provided between the dc terminals of the AC/DC power converter and the dc energy store in situations where the dc voltage provided by the AC/DC power converter is not compatible with the dc energy store. During the second mode when the energy that is stored in the dc energy store needs to be returned to the ac power supply then the AC/DC power converter can act as an inverter to convert the dc power to ac power that is compatible with the ac power supply. The AC/DC power converter is therefore capable of bidirectional power flow.

If there is a fault in the ac power supply (e.g. the ac power supply is interrupted or experiences voltage or frequency transients) then ac power will no longer be supplied from the ac power supply to the auxiliary unit(s). The dc energy store system can therefore be operated during a fault condition to supply power from the dc energy store to the auxiliary unit(s) (fault mode). The AC/DC power converter will act as an inverter to convert the dc power to ac power that is compatible with the auxiliary unit(s). The present invention is therefore able to keep the auxiliary unit(s) operating for extended periods of time during a fault condition at minimal cost by using the energy that is stored in the dc energy store. Depending on the auxiliary unit(s) that are supplied with energy during the fault, this can ensure that the dc energy store remains cooled or that any pumps associated with the dc energy store continue to operate properly. In some fault conditions it is specified that power can also be supplied from the dc energy store to the ac power supply at the same time as being supplied to the auxiliary unit(s), i.e. the second mode and fault mode can be carried out at the same time.

The dc energy store can be a battery (e.g. lithium and sodium sulphur type), capacitor, flow cell or any other similar device that is capable of storing energy.

The dc energy store system can include any suitable number of auxiliary units, but at least two might be typical. For example, one of the auxiliary units might be a pump, fan, a control unit or any other similar device that forms an integral operational part of the dc energy store. Another of the auxiliary units can be a UPS that is used to supply power to a control unit for a short time during a fault condition.

The AC/DC power converter has to vary its dc voltage to supply power to the dc energy store or receive power from the dc energy store. The AC/DC power converter often has limitations on the range of variation in its dc voltage that is not compatible with the dc energy store. If this limitation applies then the interposing DC/DC power converter can be provided. The DC/DC power converter can include a first pair of dc terminals connected to the dc terminals of the AC/DC power converter and a second pair of dc terminals connected to the dc energy store. In this arrangement, the AC/DC power converter will normally maintain a nominally constant dc link voltage and the DC/DC power converter will provide a varying dc voltage. In other words, the first pair of dc terminals of the DC/DC power converter may be regulated to be at substantially constant dc voltage while the dc voltage of the dc energy store may be subject to a significant variation in dc terminal voltage during its various operating modes.

During normal operation, the frequency of the ac power supplied by the ac power supply (i.e. the supply frequency) is set by the external ac generators or other devices that typically supply ac power to the ac power supply. The AC/DC power converter is therefore synchronised by its control firmware to follow the supply frequency and by varying its ac voltage to import or export power from the ac power supply in line with the power being imported or exported by the dc energy store. However, during a fault condition the AC/DC power converter has to rapidly change to acting as an independent source of ac power and the AC/DC power converter then acts to deliver a fixed supply frequency. This change of operating mode is made by observing the voltage of the ac power supply. The ability of the AC/DC power converter to operate in the different operating modes described above is not a normal requirement and requires specific firmware to be provided.

The AC/DC power converter and the optional DC/DC power converter can have any suitable construction.

The ac terminals of the AC/DC power converter can be connected to the ac power supply by means of a switched connection. The switched connection can include a first switch and a second switch.

The auxiliary unit(s) can be connected to the switched connection at a first junction between the first and second switches.

The switched connection can include a transformer of any suitable type which can be connected between the first switch and the first junction. The switched connection can also include a harmonic filter of any type which can be connected between the second switch and the ac terminals of the AC/DC power converter.

In a first arrangement the first and second switches are closed during normal operation so that power can be supplied from the ac power supply to the dc energy store and the auxiliary unit(s), or from the dc energy store to the ac power supply. In the event of a fault in the ac power supply then the first switch is opened to disconnect the auxiliary unit(s) from the ac power supply and the second switch remains closed so that power can be supplied from the dc energy store to the auxiliary unit(s) so that they can continue to operate normally.

In a second arrangement the auxiliary unit(s) can be connected to the first junction of the switched connection by a third switch. The auxiliary unit(s) can be further connected to the switched connection at a second junction between the second switch and the ac terminals of the AC/DC power converter (optionally between the second switch and the harmonic filter) by a fourth switch. In other words, the auxiliary unit(s) can be connected to each side of the second switch by parallel switched connections. The first, second and third switches are closed during normal operation so that power can be supplied from the ac power supply to the dc energy store and the auxiliary unit(s) or from the dc energy store to the ac power supply. In the event of a fault in the ac power supply then the second and third switches are opened to disconnect the auxiliary unit(s) from the ac power supply. The fourth switch is closed so that power can be supplied from the dc energy store to the auxiliary unit(s) so that they can continue to operate normally.

In a third arrangement the auxiliary unit(s) can be further connected to the dc terminals of the AC/DC power converter by a DC/AC power converter and a fifth switch. (The fourth switch mentioned above in connection with the second arrangement is not required.) In other words, the dc terminals of the DC/AC power converter are connected to the dc link between the AC/DC power converter and the dc energy store. If the dc energy store system includes a DC/DC power converter having a first pair of dc terminals connected to the dc terminals of the AC/DC power converter by means of a dc link, and a second pair of dc terminals connected to the dc energy store, then the auxiliary units(s) can be further connected to the dc link by the DC/AC power converter and the fifth switch. Such an arrangement will typically be used when it is necessary to keep the auxiliary unit(s) operating during a fault condition while at the same time supplying power from the dc energy store to the ac power supply. The first, second and third switches are closed and the fifth switch is open during normal operation so that power can be supplied from the ac power supply to the dc energy store and the auxiliary unit(s) or from the dc energy store to the ac power supply. In the event of a fault in the ac power supply then the third switch is opened to disconnect the auxiliary unit(s) from the ac power supply. The fifth switch is closed so that power can be supplied from the dc energy store to the auxiliary unit(s) through the DC/AC power converter so that they can continue to operate normally.

A sixth switch can be provided in the dc link and this will be closed whenever power is to be supplied to or from the dc energy store. The sixth switch is either used for maintenance conditions or if a fault occurs in the dc energy store. It is not an essential part of the system. The various switches can have any suitable construction and can be made to open and close by any suitable control unit.

The present invention provides a method of operating a dc energy store system comprising an ac power supply, a switched connection having a first switch and a second switch (and optionally a transformer and a harmonic filter), an AC/DC power converter having ac terminals connected to the ac power supply by means of the switched connection and dc terminals connected to a dc energy store (optionally by means of an interposing DC/DC power converter), and at least two auxiliary units connected to the switched connection at a first junction between the first and second switches, the method comprising the steps of: in a first mode supplying power from the ac power supply to the dc energy store; in a second mode supplying power from the dc energy store to the ac power supply; in a third mode supplying power from the ac power supply to the auxiliary units; and in the event of a fault in the ac power supply, supplying power from the dc energy store to the auxiliary units.

The present invention further provides a dc energy store system comprising: an ac power supply, a switched connection having a first switch and a second switch (and optionally a transformer and a harmonic filter), an AC/DC power converter having ac terminals connected to the ac power supply by means of the switched connection and dc terminals connected to a dc energy store (optionally by means of an interposing DC/DC power converter), and at least two auxiliary units connected to the switched connection at a first junction between the first and second switches; wherein the dc energy store system is adapted to be operated: in a first mode to supply power from the ac power supply to the dc energy store; in a second mode to supply power from the dc energy store to the ac power supply; in a third mode to supply power from the ac power supply to the auxiliary units; and in the event of a fault in the ac power supply, to supply power from the dc energy store to the auxiliary units.

Further details of the method and the dc energy store system are as described above.

BRIEF DESCRIPTION OF THE DRAWINGS

Exemplary embodiments of the invention will now be described, with reference to the accompanying drawings in which.

Figure 1:
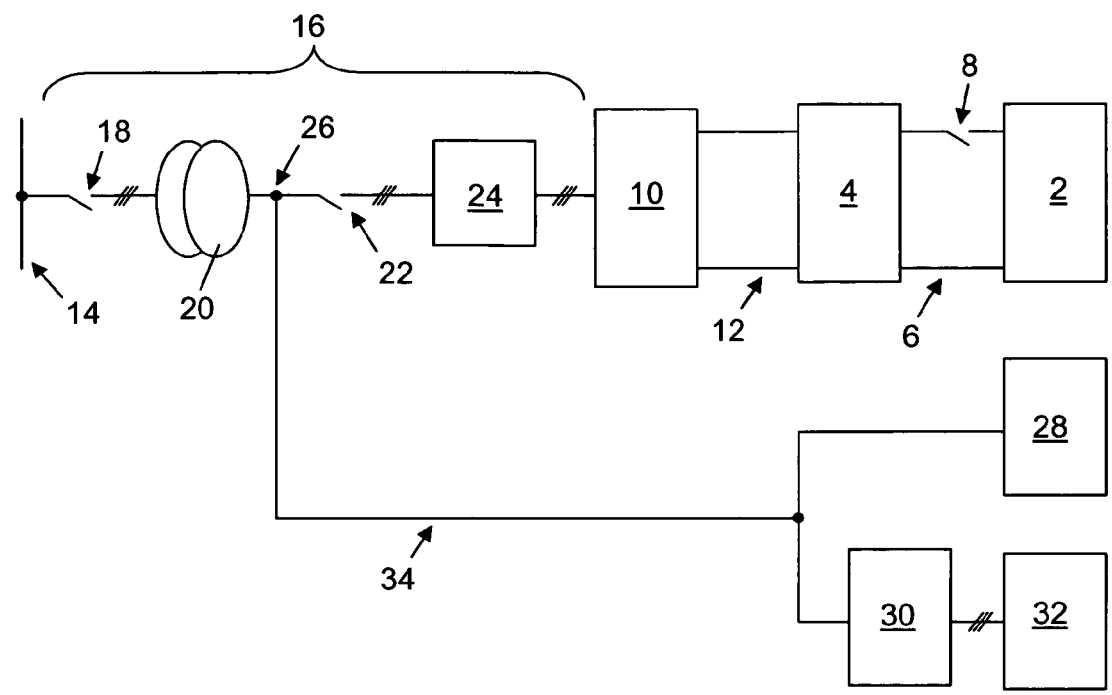
FIG. 1 is a schematic drawing of a dc energy store system in accordance with a first embodiment of the present invention.

A first embodiment of a dc energy store system will now be described with reference to FIG. 1.

DETAILED DESCRIPTION OF THE PREFERRED EMBODIMENTS

A dc energy store 2 in the form of a battery (or any other suitable dc energy store) is connected to a DC/DC power converter 4 by means of a dc link 6 that includes a switch 8. The switch 8 is closed whenever power is to be supplied to or from the dc energy store 2 and can be opened for safety and isolation purposes. The DC/DC power converter 4 is connected to the dc terminals of an AC/DC power converter 10 by means of a dc link 12. In some embodiments, the DC/DC power converter 4 can be omitted so that the dc energy store 2 is connected directly to the dc terminals of the AC/DC power converter 10.

The ac terminals of the AC/DC power converter 10 are connected to an ac power supply 14 by means of a switched connection 16. The switched connection 16 includes a first switch 18, a transformer 20 which is used to convert the ac supply voltage to a different ac voltage that is suitable for the AC/DC power converter 10, a second switch 22 and a harmonic filter 24 which is used to reduce the harmonic voltages produced by the AC/DC power converter to a level that is acceptable to the ac power supply 14.

A pump 28 and an uninterruptible power supply (UPS) 30 are connected to the switched connection 16 at a junction 26 between the transformer 20 and the second switch 22. The UPS 30 supplies power to the control unit 32 during normal operation or for short duration transients in the ac power supply. The control unit 32 is used to control the operation of the AC/DC power converter 10 and the DC/DC power converter 4 to provide the correct power flow and control of the dc energy store 2. It is therefore important that the control unit 32 continues to operate normally during a fault condition. It is for this reason that the UPS 30 is provided as part of the dc energy store system. The pump 28, UPS 30 and control unit 32 are auxiliary units of the dc energy store system.

When no power is being supplied to or from the dc energy store 2 (Mode A) then the first and second switches 18, 22 are open.

During an initial starting of the dc energy store system (Mode B) the first switch 18 is closed and the second switch 22 remains open so that the UPS 30 can be charged. When the UPS 30 and the control unit 32 are ready for operation then the second switch 22 is closed to start the AC/DC power converter 10 and the DC/DC power converter 4.

During normal operation, the first and second switches 18, 22 are closed so that power can be supplied from the ac power supply 14 to the dc energy store 2, the pump 28 and the UPS 30 (Mode C). More particularly, ac power is supplied from the ac power supply 14 to the ac terminals of the AC/DC power converter 10 by means of the switched connection 16. The AC/DC power converter 10 rectifies the ac power and supplies dc power to the dc energy store 2 by means of the DC/DC power converter 4. AC power is also supplied directly from the ac power supply 14 to the pump 28 and the UPS 30 by means of a connection 34. During normal operation, power can also be supplied from the dc energy store 2 to the ac power supply 14 (Mode D). More particularly, dc power is supplied from the dc energy store 2 to the dc terminals of the AC/DC power converter 10 by means of the DC/DC power converter 4. The AC/DC power converter 10 inverts the dc power and supplies ac power to the ac power supply 14 by means of the switched connection 16. Normal operation of the dc energy store system therefore provides for bidirectional power flow between the ac power supply 14 and the dc energy store 2 depending on whether energy is being stored in the dc energy store (Mode C) or returned to the ac power supply (Mode D).

In the event of a fault or transient in the ac power supply 14 then power can be supplied in to the fault by the system but this can result in the voltage at the junction 26 being very low, especially if the fault in the ac power supply is a short circuit. For this condition the low voltage at junction 26 can result in the pump 28 and the UPS 30 not receiving any significant power. This is acceptable for a short period (e.g. a few seconds) because the UPS 30 will keep the control unit 32 operating normally. For most faults in the ac power supply 14 the additional protection systems (not shown) will act to remove the fault and the dc energy store system can return to normal operation.

If the fault in the ac power supply 14 persists in giving a low voltage at junction 26 then the dc energy store system must adopt a shutdown condition to conserve stored energy (Mode E). To do this the first switch 18 must be opened to disconnect the pump 28, the UPS 30 and the AC/DC power converter 10 from the fault in the ac power supply 14. The second switch 22 remains closed so that power can be supplied from the dc energy store 2 to the pump 28 and the UPS 30 by means of the connection 34 that connects the auxiliary units to the junction 26 of the switched connection 16. The UPS 30 can supply power to the control unit 32 for a short period but the power from the dc energy store 2 can be used to keep the auxiliary units operating for an extended period of time. This enables the correct shutdown procedure to be carried out.

If the fault in the ac power supply 14 is the loss of the external ac generator or other device that supplies power to the ac power supply then the first and second switches 18, 22 can remain closed so that power can be supplied from the dc energy store 2 to the ac power supply 14 (Mode F). Power can also be supplied from the dc energy store 2 to the pump 28 and UPS 30 by means of the connection 34 that connects the auxiliary units to the junction 26 of the switched connection 16. The UPS 30 can supply power to the control unit 32 for a short period but the power from the dc energy store 2 can be used to keep the auxiliary units operating for an extended period of time. This enables the ac power supply 14 to receive power until the dc energy store 2 is exhausted.

The switch conditions for Modes A to F of the first embodiment are shown in Table 1 below.

A second embodiment of a dc energy store system will now be described with reference to FIG. 2. Like parts have been given the same reference numeral. The second embodiment is used when it is not possible for the dc energy store system to open the first switch 18 in the event of a fault condition.

The connection 34 that connects the pump 28 and the UPS 30 to the junction 26 includes a third switch 36. The pump 28 and the UPS 30 are also connected in parallel to the switched connection 16 at a junction 38 by a connection 40 that includes a fourth switch 42. The junction 38 is between the second switch 22 and the harmonic filter 24.

When no power is being supplied to or from the dc energy store 2 (Mode A) then the first, second, third and fourth switches 18, 22, 36 and 42 are open.

During an initial starting of the dc energy store system (Mode B) the first switch 18 and the third switch 36 are closed and the second switch 22 remains open so that the UPS 30 can be charged. When the UPS 30 and the control unit 32 are ready for operation then the second switch 22 is closed to start the AC/DC power converter 10 and the DC/DC power converter 4. The fourth switch 42 remains open during the initial starting mode.

During normal operation, the first, second and third switches 18, 22, 36 are closed so that power can be supplied from the ac power supply 14 to the dc energy store 2, the pump 28 and the UPS 30 (Mode C). More particularly, ac power is supplied from the ac power supply 14 to the ac terminals of the AC/DC power converter 10 by means of the switched connection 16. The AC/DC power converter 10 rectifies the ac power and supplies dc power to the dc energy store 2 by means of the DC/DC power converter 4. AC power is also supplied directly from the ac power supply 14 to the pump 28 and the UPS 30 by means of the connection 34. During normal operation, power can also be supplied from the dc energy store 2 to the ac power supply 14 (Mode D). More particularly, dc power is supplied from the dc energy store 2 to the dc terminals of the AC/DC power converter 10 by means of the DC/DC power converter 4. The AC/DC power converter 10 inverts the dc power and supplies ac power to the ac power supply 14 by means of the switched connection 16.

In the event of a fault or transient in the ac power supply 14 then power can be supplied in to the fault by the system but this can result in the voltage at the junction 26 being very low, especially if the fault in the ac power supply is a short circuit. For this condition the low voltage at junction 26 can result in the pump 28 and the UPS 30 not receiving any significant power. This is acceptable for a short period (e.g. a few seconds) because the UPS 30 will keep the control unit 32 operating normally. For most faults in the ac power supply 14 the additional protection systems (not shown) will act to remove the fault and the dc energy store system can return to normal operation.

If the fault in the ac power supply 14 persists in giving a low voltage at junction 26 then the dc energy store system must adopt a shutdown condition to conserve stored energy (Mode E). To do this the second and third switches 22, 36 must be opened to disconnect the pump 28, the UPS 30 and the AC/DC power converter 10 from the ac power supply 14. The fourth switch 42 can then be closed so that power can be supplied from the dc energy store 2 to the pump 28 and the UPS 30 by means of the connection 40 that connects the auxiliary units to the junction 38 of the switched connection 16. The UPS 30 can supply power to the control unit 32 for a short period but the power from the dc energy store 2 can be used to keep the auxiliary units operating for an extended period of time. This enables the correct shutdown procedure to be carried out.

If the fault in the ac power supply 14 is the loss of the external ac generator or other device that supplies power to the ac power supply then the second and third switches 22, 36 can remain closed so that power can be supplied from the dc energy store 2 to the ac power supply 14 (Mode F). Power can also be supplied from the dc energy store 2 to the pump 28 and the UPS 30 by means of the connection 34 that connects the auxiliary units to the junction 26 of the switched connection 16. The UPS 30 can supply power to the control unit 32 for a short period but the power from the dc energy store 2 can be used to keep the auxiliary units operating for an extended period of time. This enables the ac power supply 14 to receive power until the dc energy store 2 is exhausted.

The switch conditions for Modes A to F of the second embodiment are shown in Table 2 below.

A third embodiment of a dc energy store system will now be described with reference to FIG. 3. Like parts have been given the same reference numeral. The third embodiment is used when it is required that the dc energy store system supplies power in to a continuous fault in the ac power supply 14.

The connection 34 that connects the auxiliary units 28, 30 to the junction 26 includes a third switch 36. An additional DC/AC power converter 44 has its dc terminals connected to the dc link 12 and its ac terminals connected to the connection 34 by means of the fifth switch 46. (The fourth switch 42 and the connection 40 of the second embodiment are not used.)

When no power is being supplied to or from the dc energy store 2 (Mode A) then the first, second, third and fifth switches 18, 22, 36 and 46 are open.

During an initial starting of the dc energy store system (Mode B) the first switch 18 and the third switch 36 are closed and the second switch 22 remains open so that the UPS 30 can be charged. When the UPS 30 and the control unit 32 are ready for operation then the second switch 22 is closed to start the AC/DC power converter 10 and the DC/DC power converter 4.

During normal operation, the first, second and third switches 18, 22, 36 are closed so that power can be supplied from the ac power supply 14 to the dc energy store 2 and the pump 28 and the UPS 30 (Mode C). More particularly, ac power is supplied from the ac power supply 14 to the ac terminals of the AC/DC power converter 10 by means of the switched connection 16. The AC/DC power converter 10 rectifies the ac power and supplies dc power to the dc energy store 2 by means of the DC/DC power converter 4. AC power is also supplied directly from the ac power supply 14 to the pump 28 and the UPS 30 by means of the connection 34. During normal operation, power can also be supplied from the dc energy store 2 to the ac power supply 14 (Mode D). More particularly, dc power is supplied from the dc energy store 2 to the dc terminals of the AC/DC power converter 10 by means of the DC/DC power converter 4. The AC/DC power converter 10 inverts the dc power and supplies ac power to the ac power supply 14 by means of the switched connection 16.

In the event of a fault or transient in the ac power supply 14 then power can be supplied in to the fault by the system but this can result in the voltage at the junction 26 being very low, especially if the fault in the ac power supply is a short circuit. For this condition the low voltage at junction 26 can result in the pump 28 and the UPS 30 not receiving any significant power. This is acceptable for a short period (e.g. a few seconds) because the UPS 30 will keep the control unit 32 operating normally. For most faults in the ac power supply 14 the additional protection systems (not shown) will act to remove the fault and the dc energy store system can return to normal operation.

If the fault in the ac power supply 14 persists in giving a low voltage at junction 26 then the third switch 36 is opened to disconnect the pump 28 and the UPS 30 from the ac power supply (Mode E). Power can continue to be supplied into the fault in the ac power supply 14 from the dc energy store 2 in line with its specification. The fifth switch 46 is also closed so that power can be supplied from the dc energy store 2 to the pump 28 and the UPS 30 by means of the dc link 12 and the additional DC/AC power converter 44. The UPS 30 can supply power to the control unit 32 for a short period but the power from the dc energy store 2 can be used to keep the auxiliary units operating for an extended period of time. This enables the ac power supply 14 to receive power until the dc energy store 2 is exhausted.

If the fault in the ac power supply 14 is the loss of the external ac generator or other unit that supplies power to the ac power supply then the same operation can be carried out (Mode F). The UPS 30 can supply power to the control unit 32 for a short period but the power from the dc energy store 2 can be used to keep the auxiliary units operating for an extended period of time. This enables the ac power supply 14 to receive power until the dc energy store 2 is exhausted.

The switch conditions for Modes A to F of the third embodiment are shown in Table 3 below.

TABLE 1

First embodiment (FIG. 1)

| Mode | Switch condition (open or closed) | |
|---|---|---|
| | First switch 18 | Second switch 22 |
| A | Open | Open |
| B | Closed | Open |
| C | Closed | Closed |
| D | Closed | Closed |
| E | Open | Closed |
| F | Closed | Closed |

TABLE 2

Figure 2:
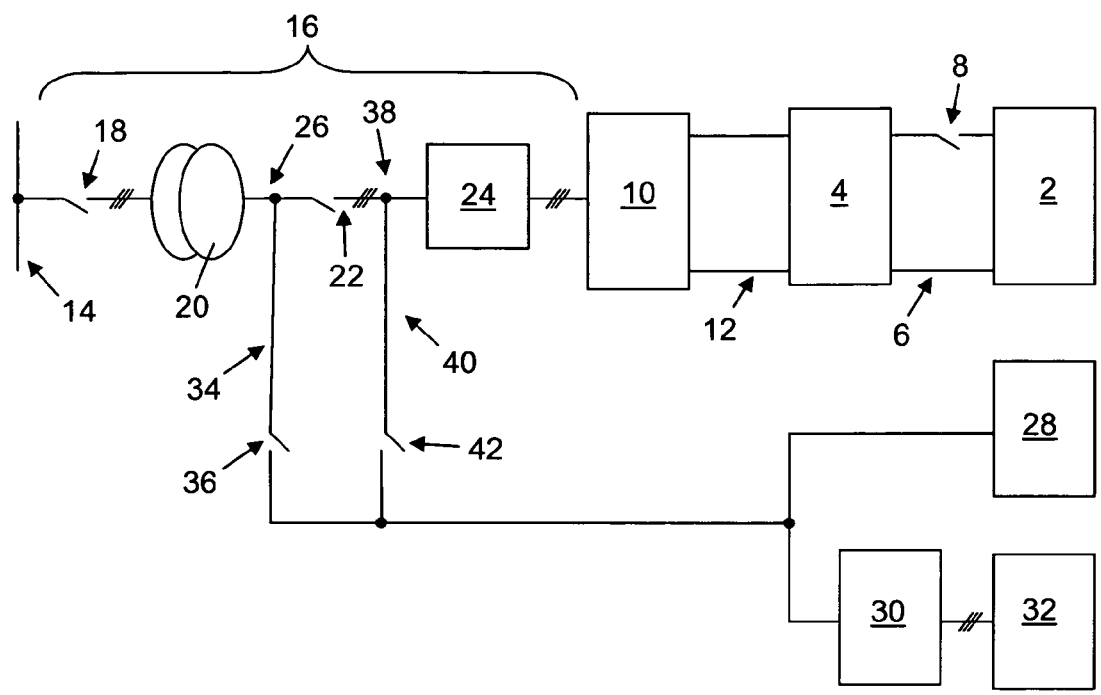
FIG. 2 is a schematic drawing of a dc energy store system in accordance with a second embodiment of the present invention.

Second embodiment (FIG. 2)

| Mode | Switch condition (open or closed) | | | |
|---|---|---|---|---|
| | First switch 18 | Second switch 22 | Third Switch 36 | Fourth switch 42 |
| A | Open | Open | Open | Open |
| B | Closed | Open | Closed | Open |
| C | Closed | Closed | Closed | Open |
| D | Closed | Closed | Closed | Open |
| E | Closed | Open | Open | Closed |
| F | Closed | Closed | Closed | Open |

TABLE 3

Figure 3:
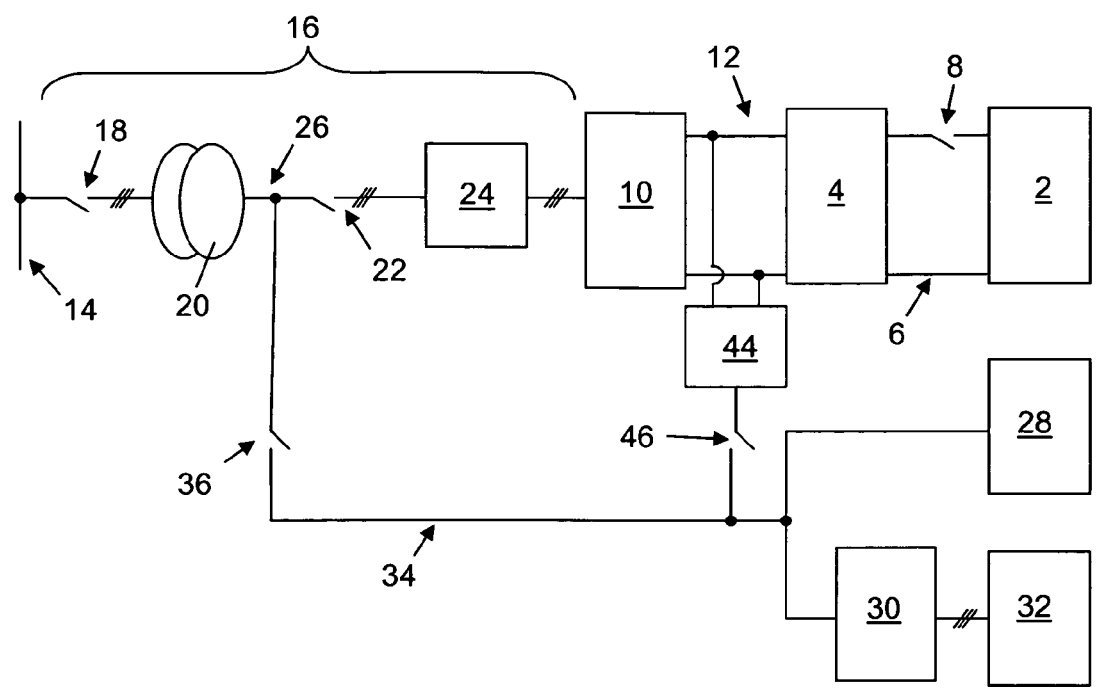
FIG. 3 is a schematic drawing of a dc energy store system in accordance with a third embodiment of the present invention.

Third embodiment (FIG. 3)

| Mode | Switch condition (open or closed) | | | |
|---|---|---|---|---|
| | First switch 18 | Second switch 22 | Third Switch 36 | Fifth switch 46 |
| A | Open | Open | Open | Open |
| B | Closed | Open | Closed | Open |
| C | Closed | Closed | Closed | Open |
| D | Closed | Closed | Closed | Open |
| E | Closed | Closed | Open | Closed |
| F | Closed | Closed | Open | Closed | where for each of Tables 1 to 3:

Mode A is where no power is being supplied to or from the dc energy store 2;

Mode B is an initial starting mode;

Mode C is where power is supplied from the ac power supply 14 to the dc energy store 2, the pump 28 and the UPS 30;

Mode D is where power is supplied from the dc energy store 2 to the ac power supply 14, the pump 28 and UPS 30 receiving power from the ac power supply 14;

Mode E is where power is being supplied from the dc energy store 2 to the pump 28 and the UPS 30 during a fault condition; and Mode F is where power is being supplied from the dc energy store 2 to the ac power supply 14, the pump 28 and the UPS 30 when the ac power supply suffers a loss of ac input power.

In all three embodiments described above the switch 8 is open during Modes A and B and closed during Modes C to F.

What is claimed is:

1. A method of operating a dc energy store system comprising a dc energy store, an AC/DC power converter having ac terminals connected to an ac power supply and dc terminals connected to the dc energy store, and at least one auxiliary unit associated with the dc energy store, the method comprising the steps of:
   (i) in a first mode supplying power from the ac power supply to the dc energy store wherein the power is stored therein;
   (ii) in a second mode supplying power from the dc energy store to the ac power supply, wherein the DC energy store supplies bi-directional power flow between the AC power supply and the DC energy store depending on whether energy is being stored in the DC energy store or returned to the ac power supply;
   (iii) in a third mode supplying power from the ac power supply to the at least one auxiliary unit associated with the dc energy store; and
   (iv) in the event of a fault in the ac power supply receiving power from an external power source, supplying the power stored from the dc energy store to the at least one auxiliary unit associated with the dc energy store and from the dc energy store back to the ac power supply, until the power stored in the dc energy store is exhausted.

2. A dc energy store system comprising:
   a dc energy store;
   an AC/DC power converter having ac terminals connected to an ac power supply and dc terminals connected to the dc energy store; and
   at least one auxiliary unit associated with the dc energy store;
   wherein the dc energy store system is adapted to be operated:
   (i) in a first mode to supply power from the ac power supply to the dc energy store, wherein the power is stored therein;
   (ii) in a second mode to supply power from the dc energy store to ac power supply, wherein the DC energy store supplies bi-directional power flow between the AC power supply and the DC energy store depending on whether energy is being stored in the DC energy store or returned to the ac power supply;
   (iii) in a third mode to supply power from the ac power supply to the at least one auxiliary unit associated with the dc energy store; and
   (iv) in the event of a fault in the ac power supply from an external power source, to supply the power stored from the dc energy store to the at least one auxiliary unit associated with the dc energy store and from the dc energy store back to the ac power supply until the power stored at the dc energy store is exhausted.

3. The dc energy store system of claim 2, wherein the ac terminals of the AC/DC power converter are connected to the ac power supply by means of a switched connection.

4. The dc energy store system of claim 3, wherein the switched connection includes a first switch and a second switch.

5. The dc energy store system of claim 4, wherein the at least one auxiliary unit is connected to the switched connection at a first junction between the first and second switches.

6. The dc energy store system of claim 5, wherein the at least one auxiliary unit is connected to the first junction of the switched connection by a third switch.

7. The dc energy store system of claim 6, wherein the at least one auxiliary unit is further connected to the switched connection at a second junction between the second switch and the ac terminals of the AC/DC by a fourth switch.

8. The dc energy store system of claim 6, wherein the at least one auxiliary unit is further connected to the dc terminals of the AC/DC power converter by a DC/AC power convener and a fifth switch.

9. The dc energy store system of claim 5, wherein the switched connection further includes a harmonic filter connected between the second switch and the ac terminals of the AC/DC power converter.

10. The dc energy store system of claim 5, wherein the switched connection further includes a transformer connected between the first switch and the first junction.

11. The dc energy store system of claim 2, further comprising a DC/DC power converter having a first pair of dc terminals connected to the dc terminals of the AC/DC power converter and a second pair of dc terminals connected to the dc energy store.

12. The dc energy store system of claim 11, further comprising a dc link between the second pair of dc terminals of the DC/DC power converter and the dc energy store, the dc link including a sixth switch.

13. The dc energy store system of claim 5, further comprising a DC/DC power converter having a first pair of dc terminals connected to the dc terminals of the AC/DC power converter by means of a dc link and a second pair of dc terminals connected to the dc energy store, wherein the at least one auxiliary unit is further connected to the dc link by a DC/AC power converter and a fifth switch.

14. The dc energy store system of claim 6, further comprising a DC/DC power converter having a first pair of dc terminals connected to the dc terminals of the AC/DC power converter by means of a dc link and a second pair of dc terminals connected to the dc energy store, wherein the at least one auxiliary unit is further connected to the dc link by a DC/AC power converter and a fifth switch.

15. The dc energy store system of claim 2, wherein the at least one auxiliary unit is a pump, a fan, an uninterruptible power supply (UPS), control unit or other device.

16. The dc energy store system of claim 2, further comprising a first auxiliary unit being an uninterruptible power supply (UPS) and a second auxiliary unit being a pump or a fan associated with the dc energy store.

17. The dc energy store system of claim 16, further comprising a control unit for controlling the operation of the AC/DC power converter, the control unit being connected to the first auxiliary unit.

18. The dc energy store system of claim 2, wherein ac power is supplied from the ac power supply to the at least one auxiliary unit in the third mode, at the same time as power is being supplied from the ac power supply to the dc energy store in the first mode or from the dc energy store to the ac power supply in the second mode.

* * * * *